United States Patent [19]

Peterson

[11] Patent Number: 5,275,126
[45] Date of Patent: Jan. 4, 1994

[54] STABILIZED HANGING BIRD PERCH WITH FEEDING CUP HAVING QUICK RELEASE FEATURE

[76] Inventor: Raymond T. Peterson, 900 SW. 18th St., Boca Raton, Fla. 33486

[21] Appl. No.: 889,102

[22] Filed: May 26, 1992

[51] Int. Cl.⁵ .................... A01K 31/12; A01K 39/01
[52] U.S. Cl. ........................ 119/26; 119/18; 119/57.9
[58] Field of Search ........... 119/18, 57.8, 57.9, 119/52.3, 24, 25, 26; 472/120, 121, 118, 124, 130; 248/317, 318, 913; 52/101

[56] References Cited

U.S. PATENT DOCUMENTS

| | | | |
|---|---|---|---|
| 910,298 | 1/1909 | Lindemann | 119/26 |
| 1,557,498 | 10/1925 | Looney | 472/118 |
| 2,493,107 | 1/1950 | Bush | 119/57.9 |
| 2,569,060 | 9/1951 | Hughes | 472/121 |
| 2,887,988 | 5/1959 | Cottongim | 119/57.9 |
| 4,026,244 | 5/1977 | Salick | |
| 4,155,548 | 5/1979 | Smith et al. | 248/317 |
| 4,384,547 | 5/1983 | Mattox | 119/18 |
| 4,523,546 | 1/1985 | Latham | |
| 4,627,384 | 12/1986 | Courteau | |
| 4,641,835 | 2/1987 | Christenson | 472/120 |
| 4,877,210 | 10/1989 | Missalla | 248/318 |
| 5,018,480 | 5/1991 | Goldman et al. | |
| 5,022,349 | 6/1991 | Bryant et al. | 119/26 |

FOREIGN PATENT DOCUMENTS 2209456 5/1989 United Kingdom ............. 119/57.9

OTHER PUBLICATIONS

Bird Talk, Mar. 1992, p. 128, Advertisement for "Mountain Manzanita".
Bird Talk, Apr. 1992, p. 79, Advertisement of Aries Mfg.

*Primary Examiner*—Gene Mancene
*Assistant Examiner*—Todd E. Manahan
*Attorney, Agent, or Firm*—Harry W. Barron

[57] ABSTRACT

A perch for a domestic bird has a tree suspended from the ceiling or other overhanging structure. The tree portion may be made using a natural hardwood or artificial tree, such as a manzanita tree, suspending its trunk and major branches in a substantially horizontal orientation. The perch is prevented from rotating about vertical and horizontal axes through the perch by being suspended at three points forming a triangle circumscribing a substantial part of the perch, including its center of gravity. In a preferred version, a bird using the perch is prevented from crawling upward on a suspension member by a disk which is mounted on the suspension member in such a way that it can be easily tipped. The perch also includes a feeding dish connected thereto by a quick release mechanism, including a pin assembly extending from the dish into a coupling which accepts the pin assembly at one angular orientation while it holds the pin assembly in place at another angular orientation.

13 Claims, 4 Drawing Sheets

STABILIZED HANGING BIRD PERCH WITH FEEDING CUP HAVING QUICK RELEASE FEATURE

BACKGROUND OF THE INVENTION

1. Field of the Invention

This invention relates to a suspended perch for a domestic bird, and more particularly, to a suspended perch with a feeding cup attached thereto by means of a quick release mechanism.

2. Description of the Prior Art

Owners of pet birds, such as parrots, should provide various types of perches, external to a cage, for indoor use and exercise by the bird. The perches should ideally imitate a natural setting for the bird, to the extent possible, and may be fabricated from nontoxic natural and nontoxic artificial materials, with hardwood trees being quite popular. The manzanita tree, which grows at high elevations in Arizona and California, provides materials which are especially suitable for this application. Small branches of the manzanita tree are commercially supplied for use within cages, and entire trees, except for leaves and roots, are supplied mounted to bases for upright use standing on the floor. In these applications, a particularly hard surface, like that of the manzanita tree, is preferred, because many birds tend to destroy the surfaces of relatively soft woods by pecking. The use of a hard wood surface provides a significant advantage over other materials, such as smooth plastics, since the bird can more easily hold onto the perch, and is thus less likely to tire.

A particular disadvantage of using a manzanita tree as it is supplied in the upright configuration is that the trunk and major branches are more vertical than horizontal. Perching birds, on the other hand, better utilize surfaces which are more horizontal on which to stand, walk and climb. A tree, placed in the conventional position with the trunk being vertical, and having horizontal attached branches sufficiently long to satisfy the needs of the perching bird would be much too large to fit inside a person's home. Advertisements from different companies in *Bird Talk* magazine, March 1992, page 138, and April, 1992, page 79, show manzanita trees, attached to stands to become upright floor standing bird perches offered for sale. The pictures of these advertisements clearly show that most of the surfaces of the trees are substantially more vertical than horizontal, which indicates the need to add horizontal branches to achieve a more mobile area.

Another disadvantage of standing trees used as perches is that many domestic birds whose wings are clipped will climb down the trunk to the floor. A bird that has climbed down form the perch may be in serious danger of being stepped upon, of chewing on an electric cord, of being attacked by another household pet, or of doing damage to furniture or other possessions of the owner. Thus, all domestic birds on conventional open perches must be supervised at all times.

Another common problem faced by the owners of domestic birds is the conventional cups used to feed the birds. Typical feeding and watering cups, generally made of stainless steel or other metals with a lead free power coat finish, or of a hard plastic coating, are provided with internally threaded bosses descending centrally from their lower surfaces to engage externally threaded bolts. Such bolts may be, in turn, used to fasten the cups, for example, to perches inside cages or on an external perch. A food or water cup should be removed every day for refilling and additionally for cleaning in order to prevent serious illnesses of the bird due to bacteria. The feeding and watering cups are removed and re-attached by unscrewing or screwing the boss into or from the threaded bolt. One problem with the attachment of cups by the conventional method is the time required for removal and re-attachment by screwing the cup off and on. This problem is particularly serious because some birds can be especially territorial concerning their food cup; many birds, even when tame, repeatedly peck any hand being used to remove this device. Another problem is that some bird have the capability of unscrewing a conventional cup unless it is tightly secured, thereby causing unnecessary spillage. A tightly secured cup, in turn, increases the time and difficulty to remove the cup, thereby permitting the bird additional time to peck at the owner.

U.S. Pat. No. 4,026,244, issued to Salick on May 31, 1977, describes a feeder for outdoor birds, which is fastened, for example, under the limb of a tree by a cord. The feed is placed in a plastic bag which is pierced by a pair of pointed sticks extending therethrough to provide perching surfaces. A feeding hole is also pierced above each such perch. A disk shaped baffle is placed on the cord above the feeder to prevent animals, such as squirrels, from climbing down the rope, or from jumping from an adjacent tree limb, to reach the feeder. While this type of baffle could also be used in the application of the present invention, i.e. to prevent a domestic bird, such as a parrot, from climbing upward from a suspended perch, its use in this way would present a disadvantage of requiring a very large diameter baffle to keep the bird from stretching from the member used to suspend the perch to an edge of the baffle.

U.S. Pat. No. 4,523,546, issued to Latham on Jan. 18, 1985, describes the use of a flexible covering sheet above the top of a bird feeder, again to keep squirrels from reaching the feeder. This sheet is fastened rigidly to a rod with hooked ends, by which the feeder is hung in place. The material of the sheet, which is in the form of a circular disk, is so flexible that the weight of a squirrel trying to climb across and around it will deflect the sheet downward, causing the squirrel to slide downward and fall off. While this type of baffle could also be used in the application of the present invention, its use in this way might allow injury to occur to a bird falling off after climbing fully or partly onto the baffle, and it may otherwise be ineffective because the weight of many domestic birds would be insufficient to cause the desired baffle deflection.

U.S. Pat. No. 4,627,384, issued to Courteau on Dec. 9, 1986, describes a floor standing artificial bird tree for exercising the anatomical features of domestic birds and for removably collecting food and bird droppings. In Courteau, a vertical support member has attached thereto a plurality of relatively short perch members and a platform with ridges to maintain food, toys, and droppings in place. The perch members have a plurality of diameter dimensions to provide a bird with means to exercise its leg muscles, with elongated perch members preferably being wood dowels having a diameter range of 1/16 to 2 inches. The upright support and platform members are also preferably wood to provide domestic bird species with chewing and clawing members.

U.S. Pat. No. 5,018,480, issued to Goldman et al on May 28, 1991, describes a simulated tree branch, made of thermoplastic material, which may be clamped to a side of a bird cage, extending inward therefrom to form a perch. The size of the Goldman et al simulated branch is limited by the size of the bird cage and thus, is generally relatively small relative to the needs of the bird to exercise.

SUMMARY OF THE INVENTION

In accordance with one aspect of the invention, there is provided a perch for a domestic bird for use beneath an overextending structure and above, and remote from, a floor. The perch includes a tree shaped member having a trunk and a plurality of branches extending from the trunk. The trunk and branches are oriented in a generally horizontal orientation and have a center of gravity. The perch further includes three attachment means fastened to the tree shaped member, the attachment means being located to form vertices of a triangle enclosing the center of gravity. In addition, the perch includes first, second and third suspension members, one end of each suspension member being attached to a different one of the three attachment means. Finally, the perch includes means for attaching the other end of the first, second, and third suspension members to the overextending structure.

BRIEF DESCRIPTION OF THE DRAWINGS

Preferred embodiments of the subject invention are hereafter described with specific reference being made to the following Figures, in which.

DETAILED DESCRIPTION

Figure 1:
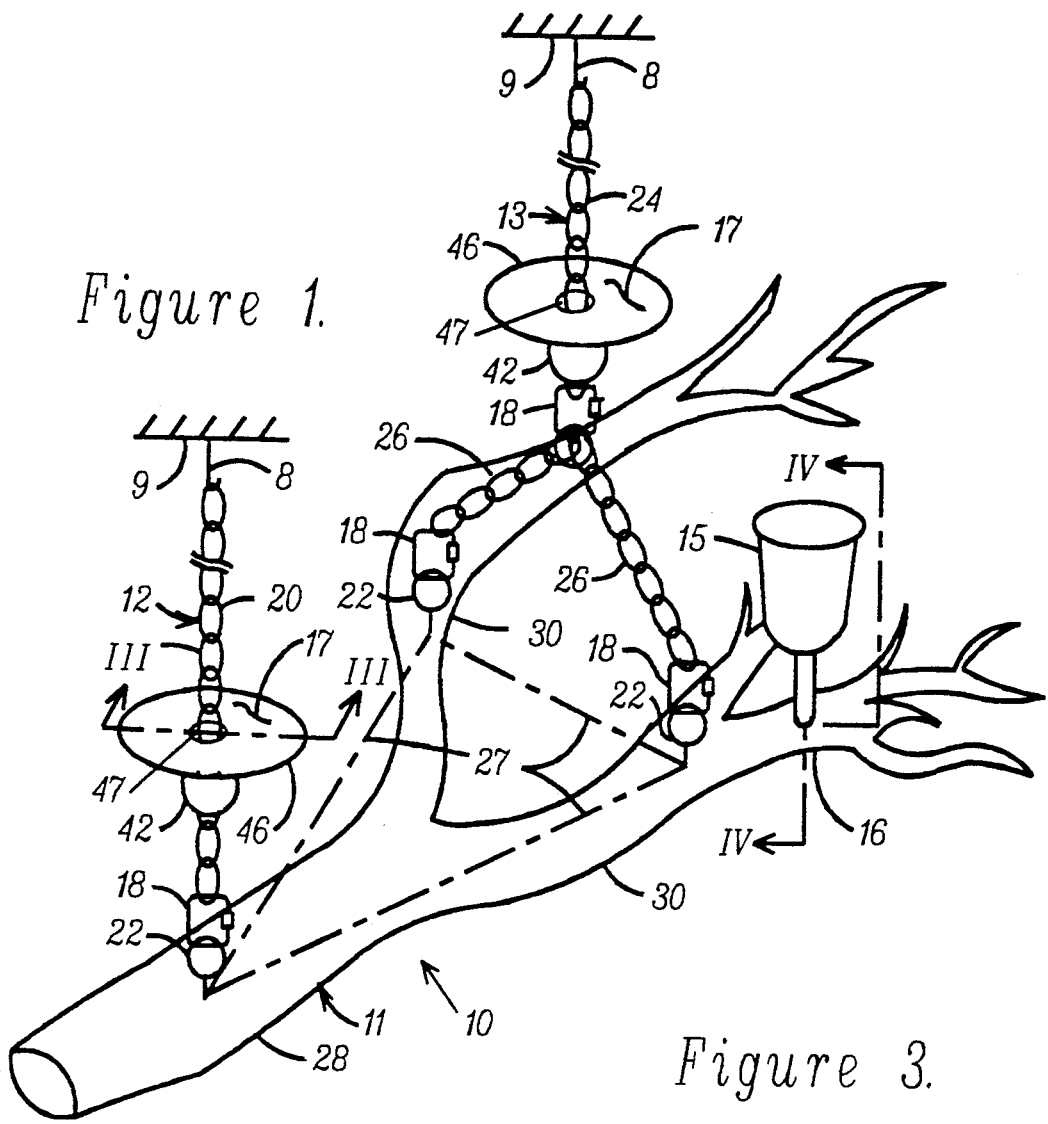
FIG. 1 is a perspective view of a stabilized hanging perch, including a feeding cup having a quick release feature.

Referring now to FIG. 1, a stabilized hanging bird perch 10 is shown. Perch 10 includes a tree 11 attached to an overhanging structure 9 by means of a straight chain assembly 12 and a bifurcated chain assembly 13. Suitable overhanging structures for this purpose include the ceiling of a building, brackets extending inward from a wall of a building, or a framework extending over the perch 10 and downward to the floor. In a preferred version of this invention, tree 11 is an essentially a whole, or large portion of a manzanita tree, except for roots and leaves, which is suspended in a generally horizontal orientation. The manzanita tree species is suggested for use because it offers an aesthetically attractive surface, which is durable enough to resist destruction by the repeated pecking of a large bird, and is small enough to fit within a reasonable amount of space which can be allocated to a bird in the owner's home. Further, manzanita tree surface provides an appropriate texture and deformities to allow a large pet bird to stand in place for a long time without tiring that would have to be the muscles used to hold onto rounded smooth surfaces with its feet and claws. Other materials, including artificial materials and other hardwood trees, may also be used to the extent the above criteria is met.

Perch 10 also includes one or more feeding cup 15 removably attached to a branch 16 of tree 11. Generally, at least two cups 15 are utilized, one for food and the other for water, although a plural number of both feeding and watering cups may also be used. For clarity, only one such cup 15 is shown in FIG. 1. Cup 15 is described in more detail hereafter with respect to FIGS. 4, 5 and 6.

Straight chain assembly 12 has a disk shaped baffle 17 attached thereto to prevent a bird using the perch 10 from climbing upward to the ceiling. Baffle 17 is described in more detail with respect to FIG. 3. Straight chain assembly 12 is fastened to tree 11 by means of a clasp 18 attached between chain 20 and an attachment ring 22 screwed or bolted into tree 11. Bifurcated chain assembly 13 includes an upper chain 24 and a pair of lower chains 26, centrally fastened by another clasp 18. Lower chains 26 are in turn fastened to attachment rings 22 by means of clasps 18. Another disk shaped baffle 17 is mounted on upper chain 24, similarly to prevent the bird from climbing beyond that baffle 17. The uppermost links of chain 20 and upper chain 24 are in turn fastened to an overextending support structure 9, such as a ceiling, by means of hooks 8 extending downward therefrom. Hardware and techniques well known in the art, presently used for hanging relatively heavy objects, such as swag lamps, can be used for attachment of these chains 20 and 24 to a ceiling.

As long as the center of gravity of tree 11, together with whatever devices are attached thereto and the bird standing at various locations thereon, lies within triangle 27 formed by the three attachment rings 22, tension is maintained in all of the chains 20, 24, and 26, so that rotation about the general horizontal axis of tree 11 is prevented. If the two chain assemblies 12 and 13 are attached to the ceiling in a spaced apart relationship, no vertical axis rotation of perch 10 is permitted. However, perch 10 is still permitted to rotate about an axis parallel to the ceiling and thereby incur a gentle swinging effect. Generally, the swing of perch 10 will be caused by reactions to movements of the bird. Because of the weight of perch 10, relative to the bird, and the length of chains 12 and 13, the amount of swinging will be quite limited and will simulate the swaying of natural tree branches in a gentle wind. In order to minimize rotation about the axis of perch 10 and about the vertical axis between the ceiling and perch 10, and further in order to permit a gentle swing of perch 10, it is desirable that the attachment of the three rings 22 to tree 11 be spread apart as far as practical.

In accordance with the preferred embodiment of this invention, tree 11 is, in reality, an entire tree, or a large portion thereof, rotated to be essentially on its side and includes a single trunk 28 and a number of major branches 30 split therefrom. The average axis of the entire tree 11 should be positioned to be generally parallel to the horizontal. Further, tree 11 is axially orientated so that the average axis through each of two major branches 30 is generally parallel to the horizontal axis. Thus, the manner in which major branches 30 are oriented and spread from trunk 28 is used to advantage in establishing triangle 27. Thus, the three points of triangle 27 should be placed on the trunk 28 and two opposite extending branches 30.

Since domestic birds of various species are particularly adapted for perching on, and walking along, essentially horizontal tree limbs, it is particularly desirable that substantial, contiguous portions of trunk 28 and major branches 30 are essentially horizontal. While such birds may be able to climb upward or downward on generally vertical surfaces having suitable textures, they can only be at rest on nearly horizontal surfaces. Thus, some trees may not be suitable for use as tree 11 because of excessive dips or rises in the trunk and major branch portions, or because their major branches are perpendicular to one another or not spread adequately to promote axial rotational stability of perch 10 by providing a suitably broad triangle formed by attachment rings 22. In some instances, individual trees may be modified to provide more suitable structures, for example, by removing inappropriate branches or adding or repositioning a major branch to increase the spread of such branches. Nevertheless, the general shape of most trees may be used to advantage in this invention.

The present invention provides the distinct advantage, over the prior art use of a manzanita tree with a floor stand holding the trunk in a vertical position in that the relatively long, essentially horizontal surfaces available with perch 10 permit the bird to both perch and walk. An advantage of flexibility is gained in that an essentially entire small tree can be used to simulate, indoors, a branch portion of a much larger tree on which any bird would naturally perch. An additional advantage is gained in that there is no supporting pole with perch 10 down which a bird can climb to the floor and which is in the way when placing a tray or old newspapers on the floor to collect bird droppings.

While the wood of the manzanita tree has proven to have particularly desirable features when used as the tree 11 of perch 10, it is understood that other hardwood species can be used as well. A single major limb, with attached branches, from a sufficiently large individual tree could be used to form tree 11. Artificial materials, such as thermoplastics proposed for the simulation of tree branches in U.S. Pat. No. 5,018,480 to Goldman et al, could also be used to form tree 11 within the scope of this invention. Furthermore, while the suspension of tree 11 by chains has been chosen for a preferred version of this invention because of the strength and decorative properties of such devices, other forms of flexible suspension devices, such as ropes made of nylon or metal wire, could be used as well.

Figure 2:
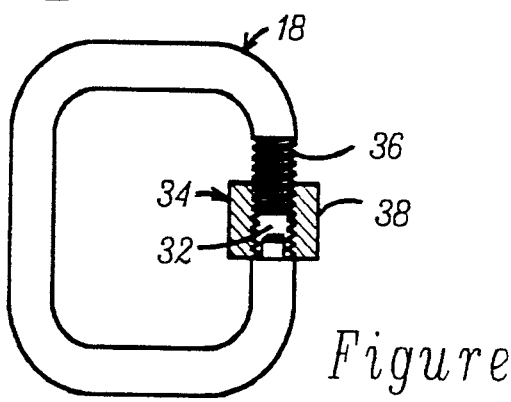
FIG. 2 is a elevation of a chain clasp used in the attachment of chain sections in the perch of FIG. 1, including a cross-sectional elevation of the nut operating therewith.

Referring now to FIG. 2, clasp 18 is shown in partial cross-section. An important consideration in the design or selection of hardware for the construction of a bird perch is the avoidance of cracks and notches in which a beak or claw can be caught. Being caught in this way could result in serious injury to the bird. Thus, each clasp 18 should have a slot 32 which may be opened to permit the passage of an end of a chain link or an attachment ring 22 and thereafter closed without any spaces in which the bird can become caught. Slot 32 may closed using nut 34 such that by turning a nut 34 as it engages screw threads 36, nut 34 will extend completely across the slot 32. An external surface 38 of nut 34 may include knurling or facets in a hexagonal shape to facilitate turning nut 34 on threads 36. Slots in the various chains, such as chain 20, are avoided by using chain links 40 having a welded closed loop construction, instead of links which are simply press formed into shape.

Figure 3:
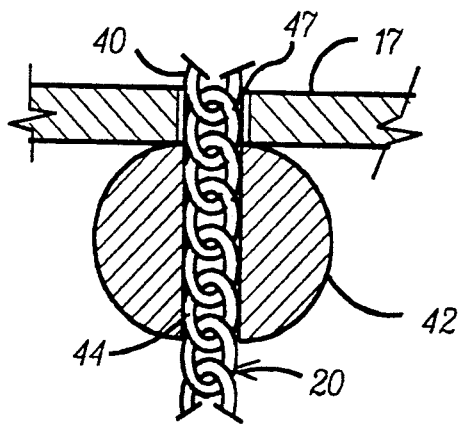
FIG. 3 is a cross-sectional elevation of a sliding elastomeric ball used to support a disk shaped baffle on a chain of the perch of FIG. 1, shown as indicated by section lines III—III in FIG. 1.

Referring now to FIG. 1 and additionally to FIG. 3, where baffle 17 is shown in more detail in a cross-sectional view. Each disk shaped baffle 17 is supported on a chain 20 or 24 by an ball 42, which is preferably made of a elastomeric foam material, having a diametral hole 44 extending therethrough to accept the chain 20 or 24. Hole 44 is sized so that the elastomeric properties of ball 42 maintain sufficient pressure on the links of chain 20 or 24 extending therethrough to hold ball 42 and baffle 17 in place on chain 20 or 24, while, at the same time, allowing the height adjustment of ball 42 on the chain 20 or 24. Each baffle 17 may be secured to the top of ball 42, or preferably, may merely be maintained against ball 42 by the action of gravity on baffle 17. A central hole 47 in baffle 17 is sized to allow the angular tipping of baffle 17 when a downward force is applied, for example, near the outer periphery 46 (shown in FIG. 1) of baffle 17. Thus, each baffle 17 is very easily tipped whenever a bird attempts to climb on it from below, placing, for example, a beak or claw on an edge of baffle 17. In this way, the bird quickly learns that the baffle does not provide a reliable surface on which to climb.

The construction of baffle 17, as seen in FIGS. 1 and 3 and described above has several advantages over disk shaped baffle systems shown in the prior art for squirrel proofing outdoor bird feeders. For example, if a rigid disk is attached in a relatively rigid manner to a descending member, as described in U.S. Pat. No. 4,026,244 to Salick, the disk must be large enough to prevent an animal from stretching between its periphery and an underlying portion of the descending chain or other suspension member. With the present invention, the disk must merely be large enough to necessitate stepping or otherwise pushing downward on its periphery while climbing over it. While the use of a flexible sheet baffle, as described in U.S. Pat. No. 4,523,546 may work properly in its intended application of squirrel proofing a bird feeder, baffle 17 has the advantage of tipping easily before the bird reaches baffle 17. Ingrainedly, the tipping scares the bird from continuing to climb on to baffle 17, so the bird will not subsequently fall off baffle 17 and be injured.

The features of present invention are understood to be particularly desirable when they are considered in view of certain inherent characteristics of domestic birds, such as parrots. For example, such birds generally want to stay in high places, where they are relatively safe. Since the baffle features of the present invention deny them the ability to climb upward toward the ceiling, and since no support pole is provided to let them climb downward to the floor, the birds generally are content to stay on perch 10, as built in accordance with the present invention, for long periods of time. Thus, perch 10 acts effectively as a cage without bars, allowing the bird to be integrated into the life of the family while remaining confined within a safe environment. This is particularly true where the bird's wings are clipped such that it cannot fly. In addition, various types of aviary toys (not shown), including rope toys for climbing, can be attached to various locations of tree 11. A perch constructed in accordance with the present invention also presents a pleasing and interesting appearance for most homes.

Figure 4:
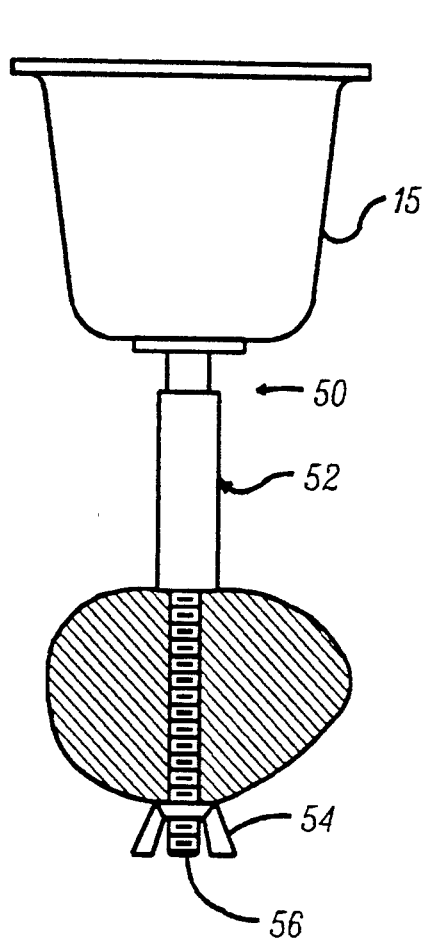
FIG. 4 is an elevation view, partially in cross-section, of a feeding cup attached within the perch of FIG. 1 by means of a quick release mechanism, shown as indicated by section lines IV—IV in FIG. 1.
Figure 6:
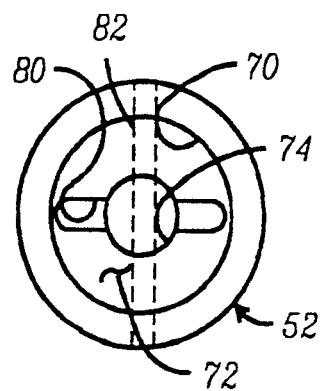
FIG. 6 is a top elevational view of the lower portion of the quick release mechanism of FIG. 5, shown as indicated by lines VI—VI in FIG. 5.
Figure 5:
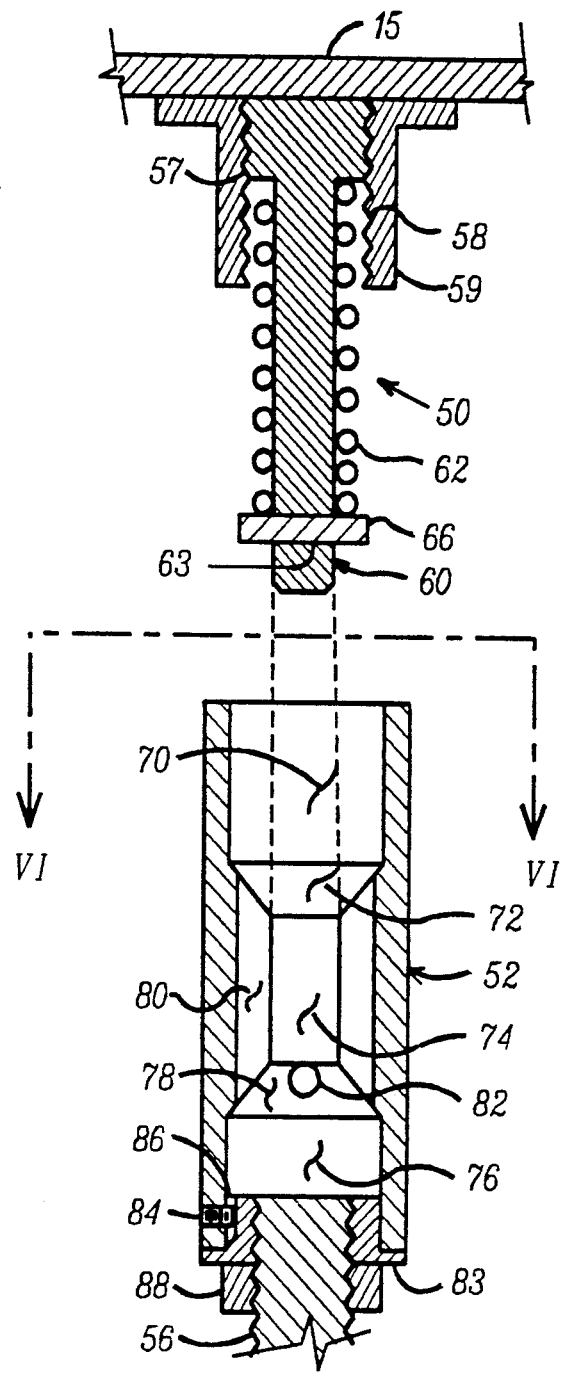
FIG. 5 is a cross-sectional exploded view of the two main portions of the quick release mechanism of the feeding cup of FIG. 4, the upper portion being attached to the feeding cup and the lower portion being attached to the perch.

Referring now to FIGS. 4 through 6, the quick release feature for the attachment of feeding cup 15 will now be described. As seen in FIG. 4, cup 15 is removably attached by means of the engagement of an attachment pin assembly 50 with an attachment coupling 52. Attachment coupling 52 is, in turn, fastened to branch 16 by means of a wing nut 54 engaging an externally threaded shaft 56, which descends through a clearance hole in branch 16 from attachment coupling 52.

FIG. 5 shows a cross-sectional view of an attachment pin assembly 50 in an exploded relationship with attachment coupling 52. Attachment pin assembly 50 descends from a lower surface of cup 15 by an externally threaded portion 57 of a pin 60 engaging an internally threaded portion 58 of a flanged collar 59 welded to the bottom of cup 15. Alternatively, portion 57 may be secured in flange collar 59 by other common techniques, such as with a suitable adhesive, or by welding, by shrink fitting or alternatively, portion 57 and flange collar 59 may be an integral unit. A number of well known welding process, such as spot welding, ring welding, or projection welding, can be used to join collar 59 to cup 15. Pin 60 narrows and extends downward from the threaded portion 57, thereby forming a ledge 61, and has a compression spring 62 is held against ledge 61 by a transverse pin 66 pressed through a hole 63 near the lower tip of central pin 60.

As seen in FIGS. 5 and 6, attachment coupling 52 includes an upper internal cavity 70 with cylindrical upper walls and a funnel shaped lower surface 72, directed toward a smaller diameter central hole 74. Attachment coupling 52 also includes a lower internal cavity 76 with cylindrical lower walls and a funnel shaped upper surface 78 directed toward central hole 74. Longitudinal slots 80 extend between the upper and lower cavities 70 and 76 on each side of central hole 74. A transverse hole 82 extends through coupling 52, intersecting funnel shaped surface 78 on each side. Externally threaded shaft 56 is attached to descend from the lower end of attachment coupling 52 by means of a internally threaded lower collar 83, fastened in lower internal cavity 76 by a set screw 84 extending into a slot 86. Shaft 56 may be locked in place against collar 83 by a locknut 88 engaging the threads of shaft 56 and the lower surface of collar 83. Alternately, a locknut 88 may not be required in some applications where the lower surface of collar 83 is held firmly against an adjoining surface, such as the upper surface of branch 13 in FIG. 4.

The engagement of cup 15 and attached pin assembly 50 to attachment coupling 52 begins with pressing cup 15 and attached pin assembly 50 downward, into the upper cavity 70 of attachment coupling 52. If the ends of pin 66 in pin assembly 50 are rotationally aligned with longitudinal slots 80 in coupling 52, pin assembly 50 can be fully depressed within coupling 52. Otherwise the downward motion of pin assembly 50 is stopped by contact between the ends of pin 66 and funnel shaped surface 72 of upper cavity 70. If this occurs, cup 15 and attached pin assembly is rotated until alignment occurs between pin 66 and slots 80, so that downward motion is allowed. This condition can be easily detected by someone turning cup 15 and attached pin assembly 50 while trying to depress pin assembly 50 through central hole 74 of coupling 52.

As the depression of cup 15 and attached pin assembly 50 is continued, the lowermost coil of compression spring 62 makes contact with funnel shaped surface 72, so that an upward force is exerted upon pin assembly 50 by the compression of spring 62. When pin assembly 50 is fully depressed into coupling 52, pin 66 has moved past funnel shaped surface 78 of lower cavity 76 and collar 59 extends downward within upper cavity 70. At this point, cup 15 and attached pin assembly 50 are rotated ninety degrees, or one fourth of a revolution, about the axis of pin assembly 50. After an initial fraction of this rotation, manual downward pressure on cup 15 may be released, allowing the upward force exerted upon pin assembly 50 by compression spring 62 to hold the ends of pin 66 against funnel shaped surface 78. When pin 66 aligns rotationally with the channel formed in surface 82 due to transverse hole 82, pin 66 moves slightly upward into the channel formed by hole 82. At this position, further rotation is prevented and cup 15 and attached pin assembly 50 are locked in place.

To remove cup 15 and attached pin assembly 50 from coupling 52, the procedure described above is essentially reversed. Specifically, a downward force is exerted on cup 15 and attached pin assembly 50 so that the ends of pin 66 are removed from transverse hole 82, and cup 15 and attached pin assembly 50 is rotated ninety degrees of one fourth of a revolution in either direction about the axis of pin assembly 50. During rotation, the downward force on cup 15 and attached pin assembly 50 may be released, so that the ends of pin 66 move upward into slots 80 when pin 66 is aligned therewith. Cup 15 and attached pin assembly 50 is then removed from coupling 52 by simply pulling it straight upward.

Thus, cup 15 and attached pin assembly 50 may be securely attached to coupling 52, while allowing for the rapid and easy removal of the cup 15 and attached pin assembly 50 for cleaning and refilling. This feature is especially important, since some tame domestic birds become very aggressive whenever anyone spends too much time removing or attaching their feed or water cups. In particular, cup 15, when pin 66 is aligned with the cut formed in the bottom of surface 78 by hole 82, is in a bird proof position in that a bird is incapable of both depressing and rotating cup 15 in order to release pin assembly 50 from coupling 52.

Referring additionally to FIG. 12, when cup 15 is removed from perch 10, coupling 52 is left attached to branch 16. Typically, when cup 15 is removed, and the bird remains on perch 10, it is necessary to avoid the use of surfaces which could cause injury to the bird, particularly when coupling 52 is exposed after cup 15 and attached pin assembly 50 are removed. In this regard, coupling 52 presents a smooth exterior and the opening of upper cavity 70 is too large to allow a claw or beak to become trapped. Further, the length of upper cavity 70 is sufficient to prevent any trapping by the relatively narrow openings of hole 74 and slots 80. Finally, spring 62, which includes narrow openings among its coils, is made a part of pin assembly 50 which is removed with cup 15, so that a bird remaining on perch 10 will not be exposed to these potentially dangerous surfaces.

Figure 7:
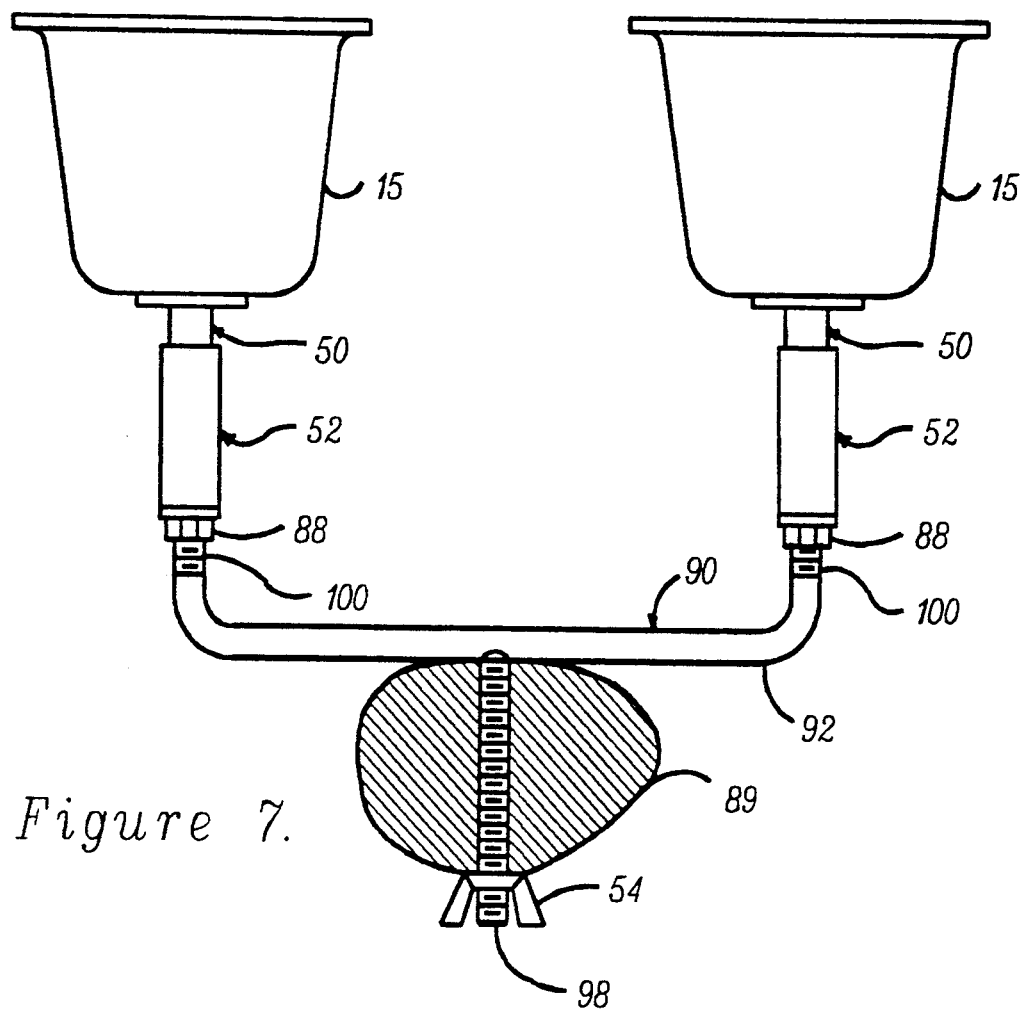
FIG. 7 is a partially sectional elevation of an alternative attachment of a pair of feeding cups within a perch assembly.

Referring now to FIG. 7, an alternative embodiment of the subject invention is shown, in which a pair of feeding cups 15 may attached to a branch 89 by means of a pair of attachment couplings 52. Each of the two couplings 52 in FIG. 7 are constructed and operate as previously discussed and are attached to a bifurcated attachment member 90. Member 90 includes a transverse attachment rod 92 welded to a descending threaded rod 98, which in turn, extends through a hole in branch 89 to be attached thereto by a wingnut 54. Transverse attachment rod 92 is formed to include a pair of upstanding threaded portions 100 upon which couplings 52 are screwed into place and held by locknuts 88. One of the cups 15 can be used, for example, for feed while the other cup 15 is used for water. In the FIG. 7 configuration, the two cups 15 are spread apart by the central portion of transverse rod 92 by an amount sufficient to permit a pet bird to walk along branch 89 between cups 15.

Figure 8:
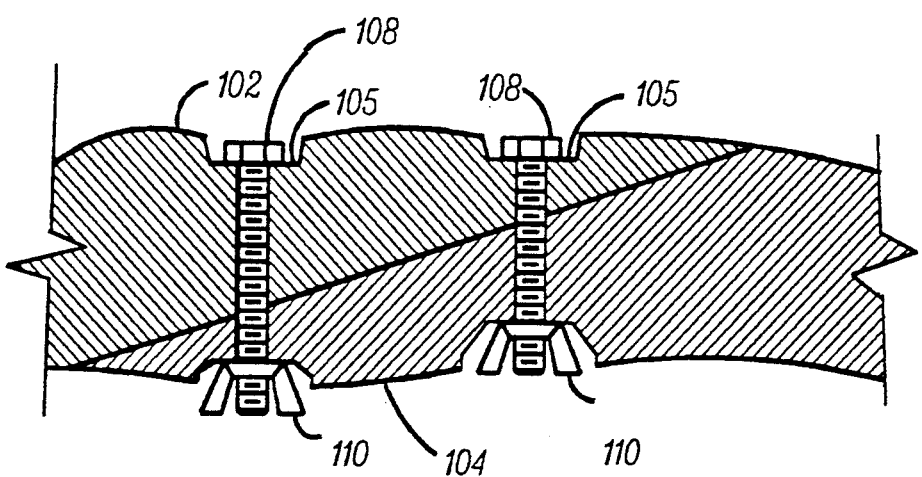
FIG. 8 is a cross-sectional elevation of separable means which may be used for the attachment of various branches within the perch of FIG. 1.

Referring now to FIG. 8, the attachment of two sections of a natural hardwood or artificial tree, forming parts, of suspended bird perch 10 are shown. In some instances, it is necessary to separate various sections of tree 11, particularly for shipment, in such a way that the various sections can be easily reassembled into the original configuration. In accordance with an aspect of the present invention, two spaced holes are drilled in a single branch, which is then sawed into two sections 102 and 104 with a single, straight cut being made at a low angle through both of the two predrilled holes. Recessed areas 105 may also be cut into the top surface of branch 102 at one or both of the ends of the holes to provide clearance for screw heads and nuts. The mating surfaces of each side of the cut may be color coded or numbered to aid in the proper reassembly of a tree 11 from which several branches have been separated. Upon reassembly, screws 108 are inserted into the holes through both sections 102 and 104, and nuts 110 are installed to clamp the two sections 102 and 104 together.

Figure 9:
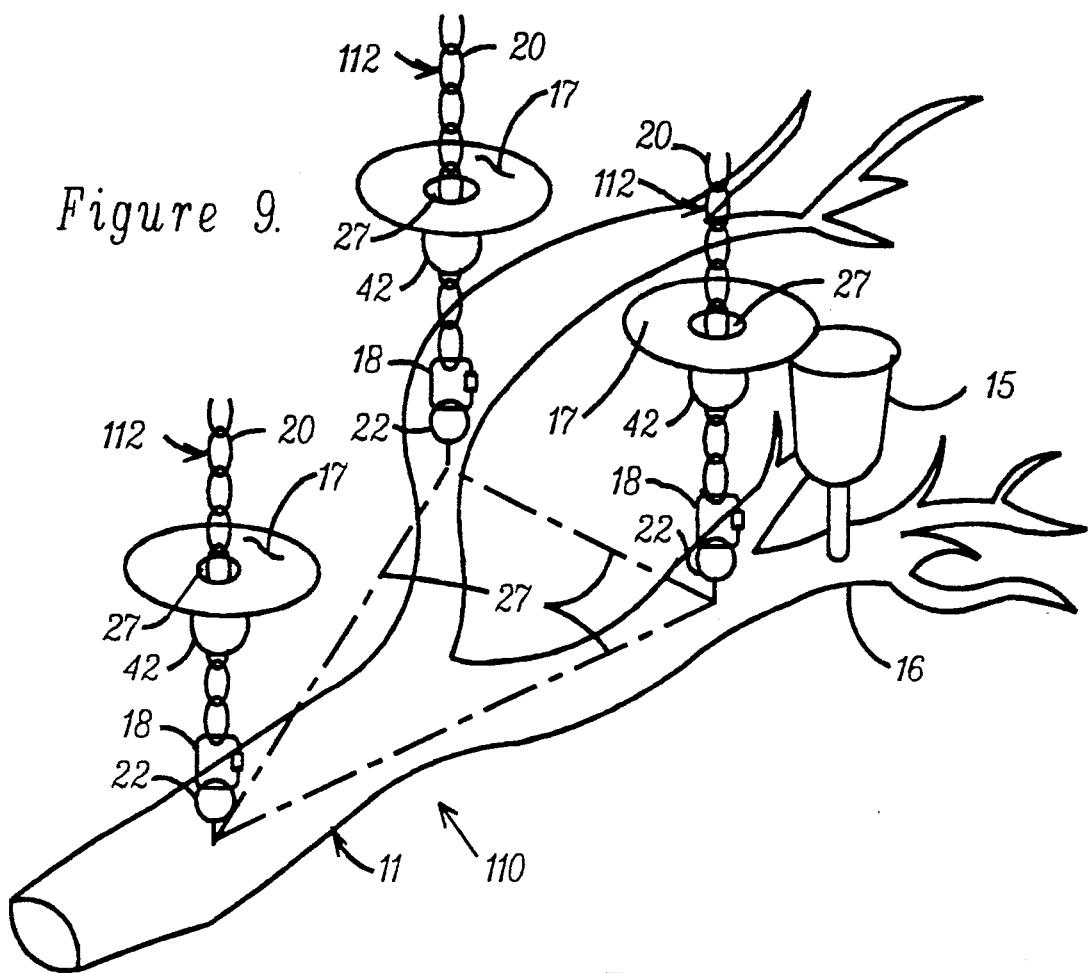
FIG. 9 is a perspective view of an alternative version of a stabilized hanging perch having a feed cup with a quick release feature.

FIG. 9 shows an alternate version 110 of a stabilized, suspended bird perch, including three similar chain assemblies 112 used to suspend a tree 11 by means of three attachment rings 22. Each chain assembly 112 is attached to an overextending structure, such as the ceiling of a building, a wall mounted bracket structure, or a floorstand structure. Various details of perch 110 may be similar or identical to corresponding details of perch 10, which have been discussed in reference to FIG. 1. A feed cup 15 is mounted using a quick release coupling 52, which has been discussed in reference to FIGS. 4 through 6. Therefore, the same reference numerals are applied to many of the items of FIG. 9 as to the corresponding items in these previous Figures. Each chain assembly 112 includes a section of chain 20, and an anti-climbing apparatus consisting of a disk 17 atop a ball 42, as described in reference to FIG. 3. The three attachment rings 22 form a triangle 27. So long as the center of gravity of perch 110, including a bird and other objects which may be added, is within the boundaries of triangle 27, a tensile force will be applied through each of the chain assemblies, and tree 11 will not rotate in any direction.

Figure 10:
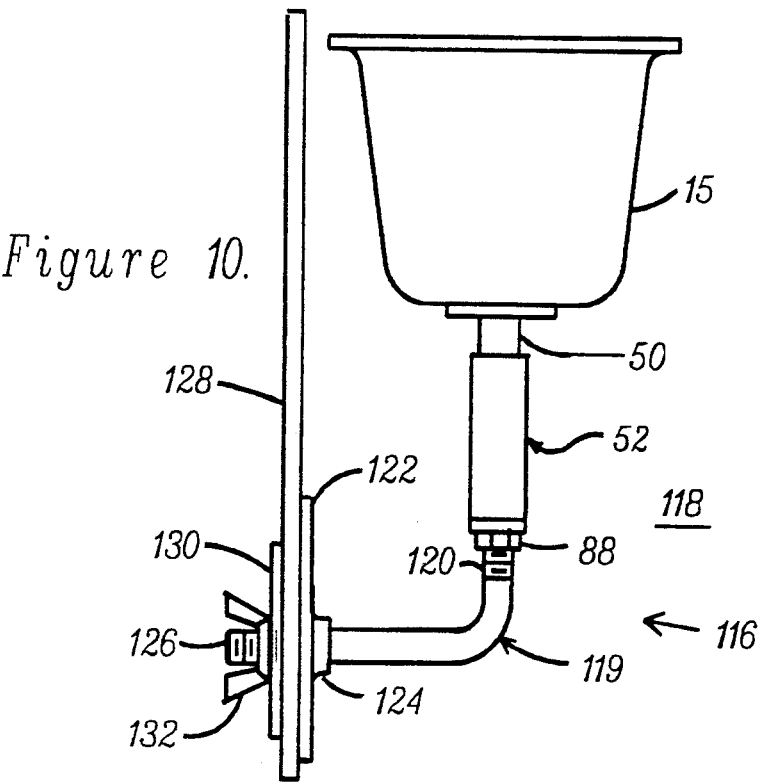
FIG. 10 is a side elevational view of a feed cup attached within a bird cage using a quick release feature.

FIG. 10 shows an alternative application of the quick release cup mechanism of this invention for use in a conventional bird cage. A bracket assembly 116 is used to support an attachment coupling 52 holding a feeding cup 15 within a bird cage 118. Bracket assembly 116 includes a formed rod 119 having, at one end, a threaded portion 120 on which coupling 52 is screwed to be held with a locknut 88. The opposite end of formed rod 119 includes an inner plate 122 with an extruded central portion 124 welded to rod 119. An externally threaded portion 126 of rod 119 is provided outside inner plate 122. This portion 126 is placed to extend between two adjacent bars 128 of cage 118, with an outer plate 130 and a wingnut 132 being placed over this portion 126 to clamp bracket assembly 116 in place on the bars 128.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. A perch for a domestic bird for use beneath an overextending structure and above, and remote from, a floor, comprising:
   a tree shaped member having a trunk and a plurality of branches extending from said trunk, said trunk and branches being oriented in a generally horizontal orientation and having a center of gravity;
   three attachment means fastened to said tree shaped member, said attachment means being located to form vertices of a triangle enclosing said center of gravity;
   first, second and third suspension members, each having two ends, one end of each suspension member being attached to a different one of said three attachment means;
   means for attaching the other end of said first, second, and third suspension members to said overextending structure; and
   a feeding member having;
      attachment means for attachment to said feeding member, said attachment means including an attachment pin extending away from said feeding member, a locking pin through said attachment pin and located towards an end thereof remote from said feeding member;
      coupling means having first and second coupling ends and separation means between said first and second coupling ends, said separation means having an opening therethrough from said first coupling end to said second coupling end configured to permit the passage of said attachment pin and said locking pin when orientated at a first angle about the axis of said attachment pin, while preventing passage therethrough of said attachment pin and locking pin when orientated other than at said first angle; and
      compression means for being compressed by passage of said attachment pin through said separation means, said separation means opening being sized to prevent the passage therethrough of said compression spring.

2. The perch according to claim 1 wherein said means for attaching said other end includes a common suspension member attached to said overextending structure and to the other ends of two of said suspension members.

3. The perch according to claim 2 further including baffle means for presenting an unstable surface to said bird as said bird climbs one of said third suspension member and said common suspension member.

4. The perch according to claim 3 wherein said baffle means includes a pair of baffle attachment means, each mounted at a mid point on one of said third suspension member and said common suspension member, and a pair of planar members, each surrounding one of said third suspension member and said common suspension member, said planar members being maintained against a convex surface of said baffle attachment means.

5. The perch according to claim 1 further including baffle means for presenting an unstable surface to said bird as said bird climbs said suspension members.

6. The perch according to claim 5 wherein said baffle means includes baffle attachment means mounted at a mid point on selected ones of said suspension members, and a planar member surrounding said selected suspension member and maintained against a convex surface of said baffle attachment means.

7. The perch according to claim 6:
wherein said baffle attachment means includes an elastomeric ball having a hole extending therethrough, said selected suspension members being within said ball hole, said ball hole having a diameter such that said ball is held in place around said selected suspension members; and
wherein said planar member includes a central hole larger than said selected suspension members, said selected suspension members being within said central hole such that said planar member is held by gravity against said ball.

8. The perch according to claim 5 wherein said baffle means includes baffle attachment means mounted at a mid point of each of said first, second and third suspension members, and a planar member surrounding each suspension member and maintained against a convex surface of said baffle attachment means.

9. The perch according to claim 8:
wherein each of said baffle attachment means includes an elastomeric ball having a hole extending therethrough, one of said first, second and third suspension members being positioned within the hole of said ball, said ball hole having a diameter such that said ball is held in place around said one of said suspension members; and
wherein said planar member includes a central hole larger than said first, second and third suspension members, each suspension member each being within said central hole of said planar member such that said planar member is held by gravity against said ball.

10. The perch according to claim 1, wherein said tree shaped member comprises part of a hardwood tree.

11. The perch according to claim 10, wherein said tree shaped member comprises a section including separate pieces joined at mating surfaces, said mating surfaces lying along a plane at an low, acute angle relative to an axis of said section, said separate pieces being held together by screws extending through said separate pieces and through said mating surfaces.

12. The perch according to claim 1, further including a snap lock feeding means attached to said perch.

13. A perch for a domestic bird for use beneath an overextending structure and above, and remote from, a floor comprising:
a tree shaped member having a trunk and a plurality of branches extending from said trunk, said trunk and branches being oriented in a generally horizontal orientation and having a center of gravity;
three attachment means fastened to said tree shaped member, said attachment means being located to form vertices of a triangle enclosing said center of gravity;
first, second and third suspension members, each having two ends, one end of each suspension member being attached to a different one of said three attachment means;
means for attaching the other end of said first, second, and third suspension members to said overextending structure; and
feeding means including a feeding dish having an attachment pin extending downward therefrom, said attachment pin having a locking pin extending through an end thereof remote from said dish in an orientation perpendicular to said attachment pin, said feeding dish further having a compression spring over said attachment pin between said locking pin and said feeding dish; and
said feeding means further including coupling means attached to said perch, said coupling means having an upper cavity, a lower cavity, and a central hole, said central hole being configured to allow passage therethrough of said attachment pin and said locking pin when orientated at a first angle about the axis of said attachment pin, while preventing passage therethrough of said attachment pin and locking pin when orientated other than at said first angle, said central hole further being configured to prevent the passage therethrough of said compression spring.

* * * * *